Jan. 15, 1963  W. F. FRENCH  3,073,076
RADIUS CUTTER GRINDING MACHINE
Filed March 21, 1960  4 Sheets-Sheet 1
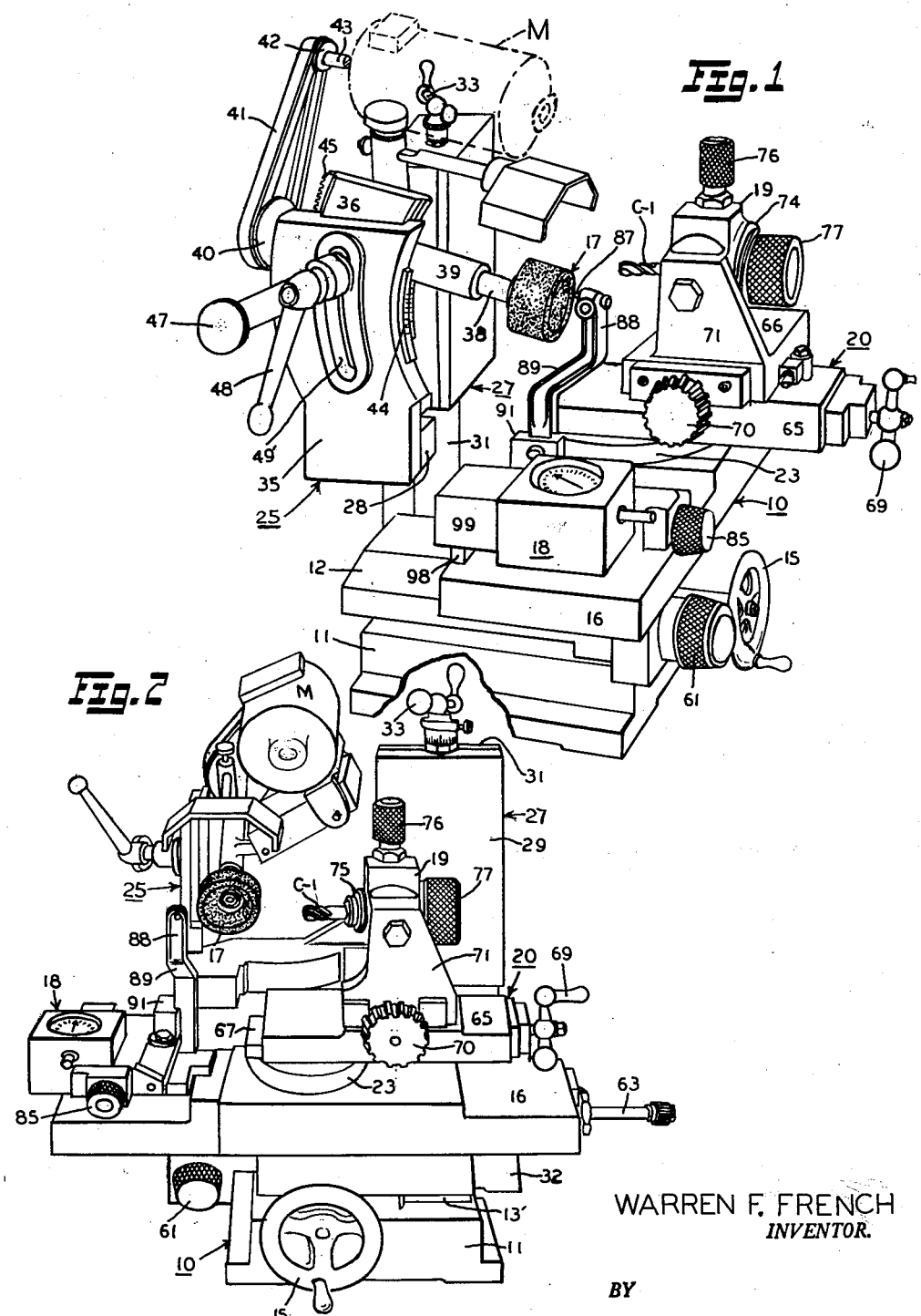
WARREN F. FRENCH
*INVENTOR.*
BY
W Russell Greenwood
ATTORNEY

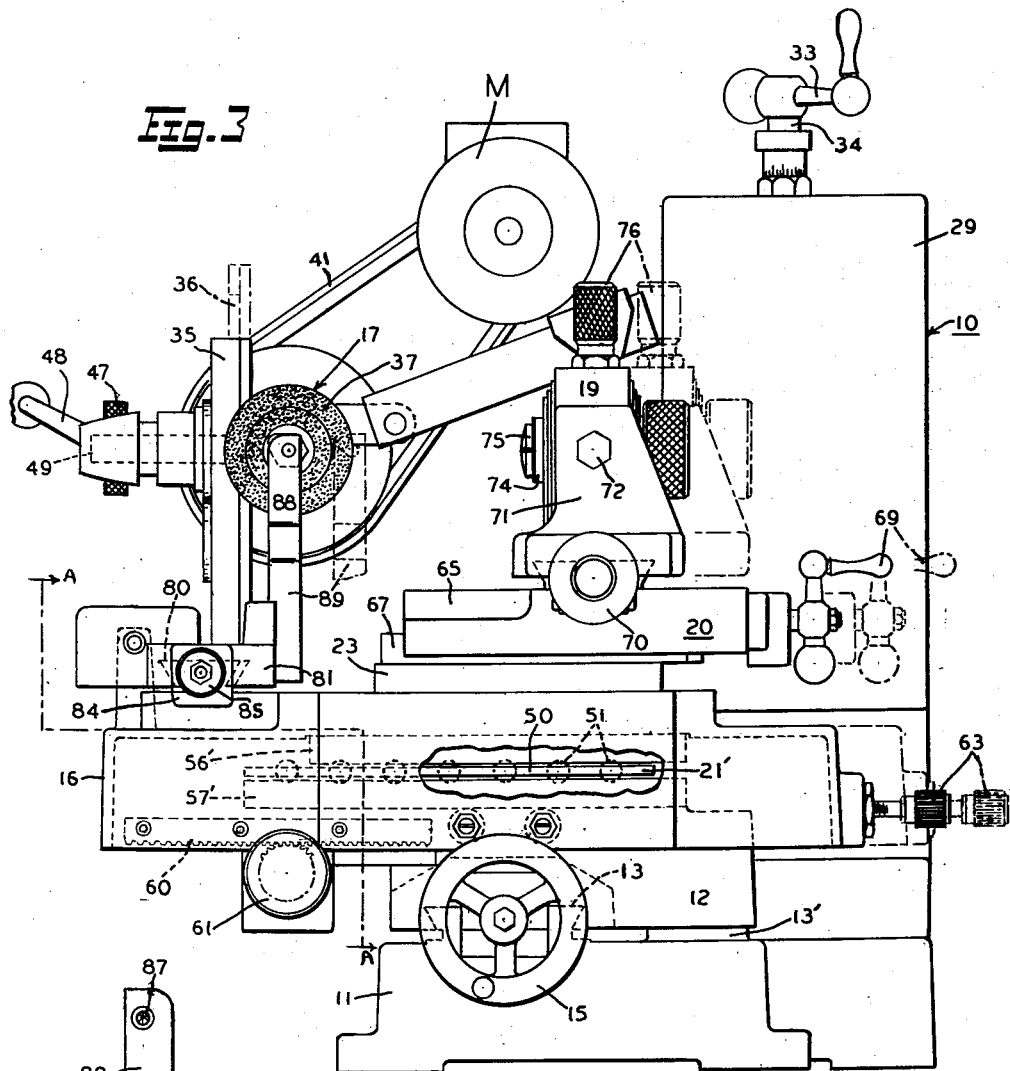
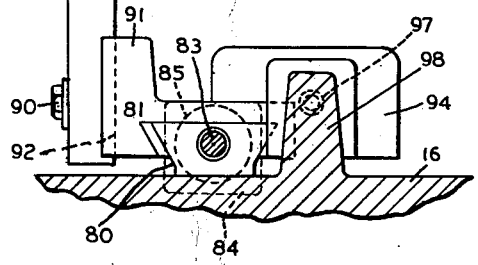

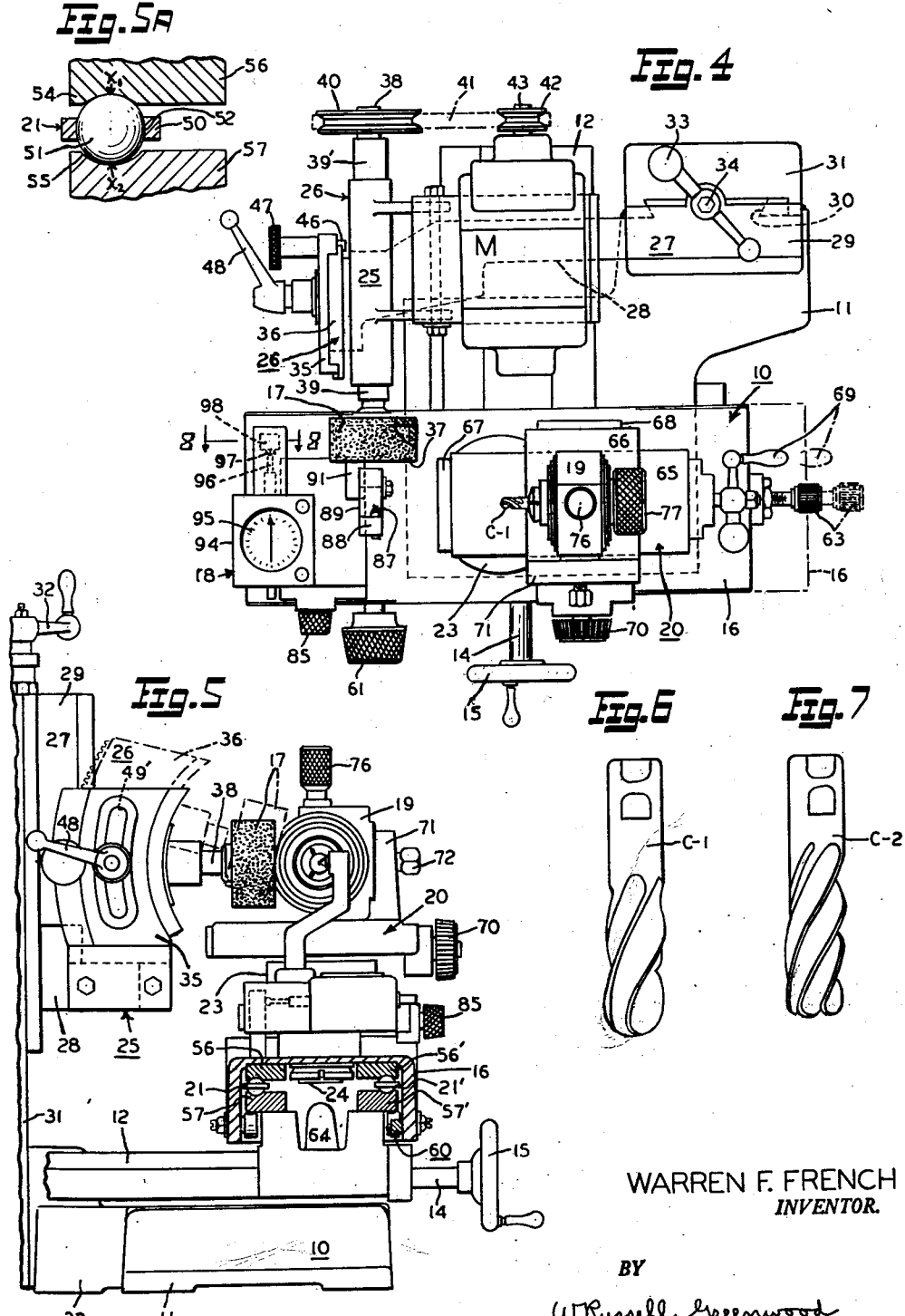

Jan. 15, 1963 W. F. FRENCH 3,073,076
RADIUS CUTTER GRINDING MACHINE
Filed March 21, 1960 4 Sheets-Sheet 4
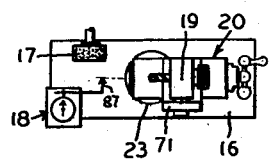
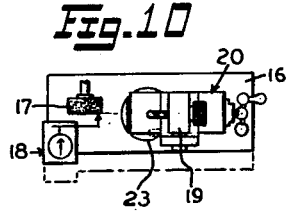
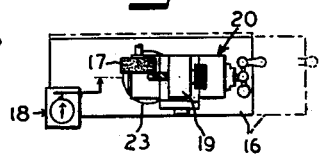
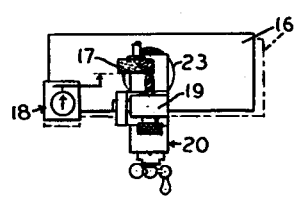
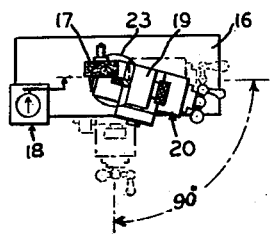
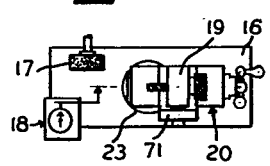
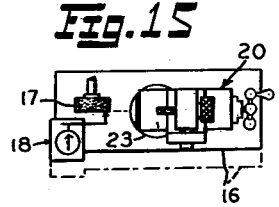
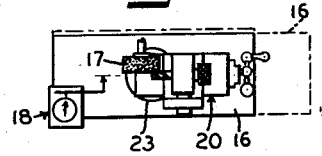
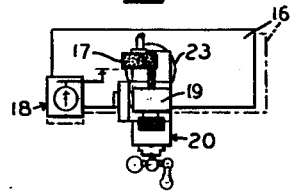
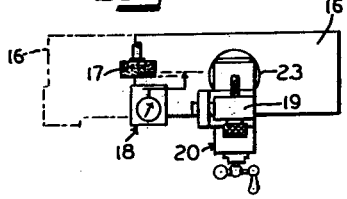
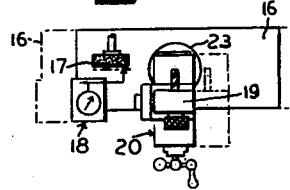
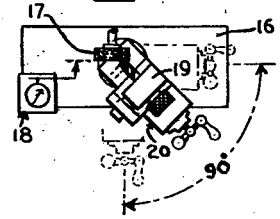
WARREN F. FRENCH
*INVENTOR.*
BY
W Russell Greenwood
ATTORNEY United States Patent Office 3,073,076
Patented Jan. 15, 1963

3,073,076
RADIUS CUTTER GRINDING MACHINE
Warren F. French, Brockton, Mass., assignor to William H. Field Co., Inc., Boston, Mass., a corporation of Massachusetts
Filed Mar. 21, 1960, Ser. No. 16,220
1 Claim. (Cl. 51—122)

This invention relates in general to cutter grinders, and, in particular, to an improved grinding machine which is designed especially, for rounding and sharpening the end teeth of ball-nose and radius-nose helical cutters, end mills, or other similar cutting tools. The grinding machine of this invention, when used to grind a ball-nose type of cutting tool, is particularly adapted to provide each end tooth thereof with a sharp cutting edge and at the same time contour it to a curved nose of a predetermined radius. Also, this machine will effect corner-rounding of the outer ends of the end teeth of a radius-nose type of cutting tool to a predetermined radius and at the same time provide each of such end teeth with a sharp cutting edge.

The invention further contemplates a novel means for dressing the grinding wheel to establish the correct location of its working face at which it will grind a radius equal to one-half the diameter of the cutter on each end tooth of ball-nose cutting tools to shape the nose of such tools to such circular contour, and also will be capable of dressing and locating accurately the active grinding face of the wheel so that it will effect corner rounding of a desired radius of curvature on the outer ends or tips of each tooth of radius-nose cutting tools.

The nature of the invention will become apparent from the following description when read in connection with the accompanying drawings, and the novel features will be particularly pointed out in the appended claim.

In the drawings:

FIG. 1 is a pictorial view of a radius cutter grinding machine constructed in accordance with the present invention;

FIG. 2 is a pictorial view of the cutter grinder illustrated in FIG. 1 and as seen from the front of the machine;

FIG. 3 is a front elevational view of the FIG. 1 cutter grinder with a wall section of the work table broken away to show details of the linear ball slide arrangement by which such work supporting table is reciprocably mounted upon the main cross slide of the machine, the guard for the grinding wheel being omitted;

FIG. 4 is a top plan view of the cutter grinder illustrated in FIG. 3 but on slightly reduced scale;

FIG. 5 is a side elevational view of the cutter grinder shown in FIG. 3 and as viewed at the left end thereof, and including a vertical section on the line A—A of FIG. 3;

FIG. 5A is a fragmentary enlarged detail view in vertical section of the linear ball slide table supporting arrangement shown at the left of FIG. 5;

FIG. 6 is a pictorial view of a typical ball-nose helical cutter having end teeth which can be shaped and sharpened by the cutter grinder of the present invention;

FIG. 7 is a pictorial view of a typical radius-nose helical cutter having end teeth which can be corner-rounded and sharpened by the cutter grinder of this invention;

FIG. 8 is an enlarged fragmentary end view, partly in section, taken on the line 8—8 of FIG. 4 and looking in the direction of the arrows;

FIGS. 9 to 13 inclusive are diagrammatic views illustrating the grinding method which may be practiced by the present invention and the sequence of steps employed in the practice of such method to estabilsh the correct location of the working face of the grinding wheel preparatory to grinding a ball-nose cutting tool as well as depicting the various positions assumed by the movable machine parts and the supported cutting tool in relation to the grinding wheel to effect sharpening and shaping of each end tooth of the cutter to a predetermined nose radius; and FIGS. 14 to 20 inclusive are diagrammatic views illustrating the grinding method which may be practiced by this invention and the sequence of steps employed in the practice of such method for establishing the correct location of the working face of the grinding wheel preparatory to grinding a radius-nose cutting tool, as well as depicting the various positions assumed by the movable machine parts and the supported cutting tool in relation to the grinding wheel to effect sharpening and corner-rounding of the tips of each end tooth to a predetermined radius of curvature.

Referring now to the drawings, and in particular to FIGS. 1 through 5 thereof, the invention is there shown as embodied in a cutter grinding machine which is designated generally by the reference numeral 10, and has its general structural arrangement of parts similar to that of the cutter grinding machine shown and described in U.S. Patent No. 2,787,094, granted to me on April 2, 1957.

The improved cutter grinding machine 10, as here shown, comprises a rigid base or support 11 upon which is carried a laterally traversable cross slide 12. The cross slide 12 is operatively arranged for longitudinal movement on suitable slideways 13 and 13' on the machine base 11, see FIG. 3, and is adjustable laterally thereof into desired adjusted positions by means of a conventional type of feed screw mechanism which includes a suitable feed screw 14 arranged to be operated by a hand wheel 15. A horizontally reciprocable elongated work conveying table 16 is mounted upon the cross slide 12 for reciprocation in a longitudinal direction past the moving grinding surface of a grinding wheel 17 subsequently to be described in greater detail. The table 16 permanently carries thereon a grinding wheel dressing device which is herein generally designated by the reference numeral 18, and also mounts a swingable head assembly which includes an indexible work-supporting head member 19, the said head assembly also being horizontally adjustable in two directions at right angles to each other and being herein designated generally by the reference numeral 20.

The work conveying table 16 is slidably mounted upon the cross slide 12 by means of two linear motion type of ball slide devices 21 and 21', see FIGS. 3 and 5, each being of identical construction, the details of which will be described hereinafter. However, mention is here made that such type of mount for a movable work holding or carrying table of a machine is known in the art, as is disclosed in U.S. Patent No. 1,443,789, granted January 30, 1923, and also that the general constructional arrangement of my presently illustrated ball slide devices is similar to those which are shown and described in the patent just-named.

The table 16 also carries a turntable member 23 which is pivoted as on a suitable vertical pin whose lower end is shown in FIG. 5 at 24 for swinging movement upon the top surface of the table 16 and this turntable mounts thereon the work-supporting head assembly 20.

The machine has a grinding wheel head assembly which is both elevatable and tiltable and designated generally by the reference numeral 25 and comprises a grinding wheel slide unit 26 and a supporting carriage 27 therefor. The carriage structure includes a horizontally disposed arm 28 provided at one end with a vertical slide member 29 by which the carriage 27 is supported and arranged for vertical movement along suitable dovetail slideways, indicated at 30 in FIG. 4, for effecting alitudinal adjustment of the carriage 27 on a rigid slide support bracket member 31 upstanding from and fixedly mounted at its lower end to a rear extension 32 of the machine base 11.

Vertical adjustments of the carriage 27 on the bracket 31 are effected by means of a manually operable ball-crank machine handle 33 to turn a suitable feed screw 34 which is carried by the carriage 27 and operatively connected to the bracket 31. The grinding wheel 17 is mounted forwardly in an overhanging relation to the free end of the horizontal arm 28 of the carriage 27, and the wheel 17 is supported for angular adjustment thereon in a vertical plane perpendicular to the plane of vertical altitudinal adjustment of the carriage 27 by means of a pair of interengaging arcuately shaped machine slide members 35 and 36 which are fixed upright to the outer end of the arm 28 and to the grinding wheel slide unit 26, respectively, see FIGS. 1, 4 and 5.

The grinding wheel 17, which is usually of the cylindrical cup-shaped form here shown and has a plane annular end grinding face 37, is removably secured to the forward end of a rotatable grinding wheel spindle 38 journaled in suitable overhung tubular bearing members 39 and 39' respectively which project laterally of the grinding wheel slide unit 26 and are disposed close to the arcuate slide member 36 thereof. A V-belt drive is employed for driving the grinding wheel spindle 38 from an electric motor M, see FIGS. 1 to 4 inclusive, this drive comprising a V-pulley 40 secured on the rear end of the spindle 38 and about which passes a V-belt 41 which is driven by a V-pulley 42 fast on the projected end of the armature shaft 43 of the electric motor M.

The arcuate slides 35 and 36 are provided respectively with cooperating graduated scale markings, as indicated at 44 in FIG. 1, so as to facilitate the setting of the grinding wheel slide unit 26 angularly a predetermined amount for tilting the grinding wheel 17 so as to enable its grinding surface 37 to grind the proper clearance angle on the cutting edges of the end teeth of the cutting tool required to be sharpened. The arcuate slide 36 also carries a circular rack 45 having in mesh therewith a pinion gear 46 which is operatively connected to a machine knob 47 for effecting manual adjustment of the slide 36 to a desired angular setting. A two-ball type of clamping lever 48 having screw-threaded connection on the threaded outer end of a pin 49 fast to the slide 36 and projecting outwardly through an arcuate slotted opening 49' formed in the arcuate slide 35 clampingly secures the arcuate slide 36 fixed in any of its adjusted settings upon tightening of the lever 48 against suitable collars on the pin 49 between the lever and slide 35.

As previously stated, the longitudinally reciprocable table 16 is mounted for linear motion upon the transversely adjustable cross slide 12 by means of the two-ball slide devices 21 and 21'. Since the constructional arrangement of the ball slide devices are identical, the description of one will suffice for the other. As illustrated in FIGS. 3, 5 and 5A, each of the ball slide devices 21 and 21' comprises a floating flat retainer strip or bar 50 in which there is retained a plurality of hardened balls 51 which are freely rotatable in a series of holes 52 through the bar or strip 50 and disposed linearly therealong in a longitudinally extending row, the balls 51 protruding outwardly from the holes 52 beyond the top and bottom surfaces of the bar or strip 50. The balls 51 all roll in a straight line in two opposed pairs of arcuate grooves 54 and 55, see FIG. 5A, which extend longitudinally of and are formed respectively in the bottom surface of the movable upper machine slide member 56 or 56' of the work table 16 and in the top surface of the opposed stationary lower slideway elements 57 or 57' of the grinding machine base member 11.

As depicted in FIG. 5A, the radius of curvature of each of the pairs of arcuate grooves 54 and 55 is made slightly greater than that of the balls 51, i.e. of the order of from one to two thousandths of an inch larger, so as to insure that the outer spherical surface of the balls 51 will have rolling contact at only one point with each of the arcuate surfaces of the pairs of grooves 54 and 55, as indicated at $X_1$ and $X_2$ in FIG. 5A, and thus will roll in a straight line thereon at all times without slipping in either groove as the table 16 is reciprocated back and forth on the machine base 11. This will insure that the ball retainer bar or strip 50 together with all the balls 51 retained therein will partake of linear motion bodily between the arcuate grooves of the cooperating pair of upper and lower machine slide members 56 and 57 or 56' and 57', as the ball retainer bar 50 is moved linearly with the balls 51 as they roll in one direction along the lower machine slide member 57 or 57' during longitudinal movement of the table 16 in the same direction and thereby will be returned to their starting position along with the table as the latter is slid back on the balls in the opposite direction and returned to its starting position with respect to the machine base member 11.

Means are provided for effecting reciprocation of the table 16 longitudinally past the working grinding surface 37 of the grinding wheel 17 and in a direction at right angles to the rotational axis of the grinding wheel spindle 38. To this end, there is provided a rack and gear mechanism which is generally designated by the reference numeral 60 and operable by a knob member 61 which when manually turned back and forth in appropriate directions and to a desired and sufficient extent by the machine operator will effect the required reciprocation of the table 16 past the annular grinding surface 37 of the grinding wheel 17 so as to alternately bring into engagement with such moving grinding surface either the dressing tool of the wheel dressing device 18 or one of the end teeth of a cutting tool held by the work-supporting head assembly 20, as will be hereinafter described. The extent of longitudinal travel of the table 16 toward the grinding wheel 17 can be limited to appropriate adjustment of an adjustable stop screw 63, see FIGS. 2, 3 and 4, which is carried by the moving table 16 and coacts with a suitable rigid abutment element 64 upstanding from the top of the machine base 11 between the slideways 57 and 57' thereof, see FIG. 5.

The work carrying or supporting head assembly 20 includes two superposed elongated slide members 65 and 66 which are horizontally disposed and longitudinally movable relative to each other in two directions at right angles to one another, see FIGS. 3 and 4, the slide member 65 being mounted on suitable ways, as indicated at 67 in FIG. 4, for longitudinal sliding movement laterally on the top of the turntable 23, and the slide member 66 being slidably arranged on the slide 65 for movement crosswise thereof, as indicated by the slideway 68, see FIG. 4. Suitable slide adjusting mechanisms including feed screws (not shown) are provided to effect separate manual adjustment of the slide members 65 and 66 for establishing the correct placement of the nose end and axial disposition of the particular ball-nose or radius-nose cutting tool held in the head member 19 preparatory to grinding the end teeth thereof, as will be hereinafter described, and the feed screws of these slide adjusting mechanisms are operatively arranged to be turned manually by the ball-crank machine handle 69 and the machine knob 70 respectively.

The work holding or supporting head member 19 is carried by the slide member 66 and is disposed thereon so as to overhang the top surface of the latter in which position it is rigidly supported by an upright arm 71 integral with one end of the slide member 66 and to which arm it is fixedly secured, as by a bolt 72.

The work holding or supporting head member 19 is of generally block-like formation and has a central hub-like portion 74 in which is arranged for longitudinal and rotational movements in a known manner an indexible work holding collet 75, see FIGS. 2 and 3. The collet 75 may be rendered freely rotatable in the hub portion 74 or locked therein in any desired angular setting, after indexing, upon appropriate manual operation of retractile pin type plunger 76. An enlarged hand-operated clamping nut 77 having screw-threaded connection with the usual threaded shank end of the collet 75 provides a means for imparting longitudinal movement to the collet with respect to the hub 74 and apply sufficient force to the collet to effect contraction of its work-gripping end portion sufficient to effect a tight clamping of the usual shank portion of a helical cutting tool having its end teeth required to be sharpened and contoured to a predetermined nose radius or with corner rounding of its tip ends, such as for example, a ball-nose helical cutter C-1 of the type shown in FIG. 6 or a radius-nose helical cutter C-2 as shown in FIG. 7. It will be understood, of course, that the helical cutters and end mills which are to be ground can have various well known types of shanks which are common to such cutting tools, such as those provided either with Weldon shanks, with Brown and Sharpe taper shanks, with Morse taper shanks, or with straight shanks, and of a size to fit into and be tightly held by the collet 75.

Reference now will be made to the wheel dressing device 18 of the present invention for dressing and truing the annular working surface 37 of the grinding wheel 17 to initially establish, in preparation for grinding of the cutting tools, the correct location within precise limits of accuracy of the aforementioned working grinding surface whereby it can effect accurate radius-rounding and sharpening of the end teeth of ball-nose and radius-nose helical cutters, end mills, and other similar cutting tools, this device being most clearly shown in FIGS. 1, 2, 3, 4, 5 and 8. Affixed to the top surface of the table 16 and disposed laterally thereof is an external dovetail bar member or slide 80 upon which is mounted an internal dovetail machine slide 81 which is arranged for horizontal adjustment longitudinally of the bar slide 80 by means of a suitable feed screw 83 operatively connected internally to the slide 81 and suitably journaled in a bearing housing 84 which is affixed to the forward end of the slide 81, see FIG. 8. The feed screw 83 is provided at its forward end with suitable knob 85 for turning the screw to effect desired manual adjustments of the slide 81 on the fixed bar slide 80.

A wheel dressing tool 87 which is here shown as being in the form of a diamond point is adjustably mounted in a known manner at the upper end of an upright arm 88 of an angularly-bent flatsided bar member 89 which is fixedly secured at its lower end, as by a bolt 90 to the side of an upright lug 91 integral with the righthand rear corner of the slide 81, see FIG. 4, the lower end portion of the bar 89 being inset sidewise in a vertical flat-sided groove 92 continuous with the lug and the side of the slide 81 adjacent thereto, see FIG. 8, with a snug fit and to sufficient depth whereby it will be maintained rigid with the slide 81. Diagonally across from the lug 91 and mounted on the top surface of the slide 81 at its forward lefthand corner position and extending therefrom laterally of this slide in overhanging relation thereto is fixedly mounted an open top dial indicator gauge housing 94 within which is horizontally positioned a high precision spring plunger type adjustable dial indicator 95 which is of conventional construction and has its usual spindle or actuating plunger 96 extended in a rearward direction with the contact point 97 thereof firmly engaged against the forward flat vertical surface of a rigid flat-sided block-like projection 98 here shown as being integral with the top of the table member 16, see FIG. 8, but it may comprise instead a separate body of metal which is bolted in place thereon. The block-like projection 98 and the dial indicator spindle 96 engaged therewith are covered by a hood 99 which is open on the bottom and is formed integral with the housing 94 and constitutes a rearward extension thereof.

It is believed that the general operation of my cutter grinding machine will be clear from the foregoing description but that the manner in which it is used for grinding the end teeth of ball-nose and radius-nose helical cutters, end mills, and other similar cutting tools to sharpen and reshape such teeth to their original rounded contours will require a more detailed explanation which now is presently set forth in connection with FIGS. 9 to 20 inclusive of the drawings.

Also, it is to be understood that in FIGS. 9, 10, 13 and 14 wherein is depicted the dressing operation of the working face of the grinding wheel 17, the rotational axis of the latter will be adjusted so as to lie in a horizontal plane, as by means of appropriate adjustment of the slide 36 and the wheel spindle 38. After the wheel 17 has been dressed, the wheel spindle 38 is readjusted to the proper inclination to tilt the dressed working face of the wheel 17 at the proper angle whereby it will grind the required clearance angle on the cutter teeth which are to be sharpened; and it is in the last-described position that the grinding wheel 17 has been depicted in FIGS. 11–13 and 16–20 as well as indicating therein the relative positions taken by the various machine parts with respect to the grinding wheel in the performance of a cutter grinding operation.

The cutter grinding machine of the invention is used in the following manner and as depicted in FIGS. 9 to 13 inclusive of the drawings to sharpen and circularly contour the end teeth of ball-nose helical cutters, end mills, or other similar cutting tools:

A ball-nose cutter to be sharpened and circularly contoured, which may be of the type C-1 shown in FIG. 6, has its shank mounted in the collet 75 of the indexible work-supporting head member 19 where it is tightly clamped therein by the clamping nut 77. When thus-mounted, the helical toothed body portion of this cutter mounted, the helical toothed body portion of this cutter projects outwardly and forwardly of the head member 19 in an overhung relation with the top surface of the table 16 with the longitudinal axis of the cutter C-1 disposed horizontally and at right angles to the rotational axis of the grinding wheel 17. The longitudinal axis of the cutter C-1 is brought into vertical register with the longitudinal center line of the work table 16 (see FIG. 9) by appropriate adjustment of the slide 65 by the knob 70 (see FIGS. 1 to 4).

It is supposed that the axis of the grinding wheel spindle 38 now has been temporarily adjusted and set to a horizontal position and that the plane of the front annular face 37 of the grinding wheel 17 is disposed substantially vertically to be properly trued off by the dressing tool 87 when the wheel dressing operation is carried out, as will be hereinafter described.

Next, the point of the diamond dressing tool 87 is set even with the line of the horizontal longitudinal axis of the cutter C-1 as thus-placed in vertical register by appropriate adjustment of the slide member 81 by means of its feed screw 83 turned by the knob 85.

Following this, simultaneous feeding movements of the dressing tool 87 and the work table 16 and the work holder 19 carrying the cutting tool C-1 as thus-mounted, all at the same rate of feed in a direction toward the moving grinding surface 37 and in a line normal to a plane containing such surface, are effected by appropriate adjustment of the cross slide 12 by the feed mechanism operated by the hand wheel 15 (see FIG. 10). Then, the table 16 is reciprocated in a direction so as to traverse the dressing tool 87 carried thereon past the moving grinding surface 37 while continuing the aforesaid feeding movements of the dressing tool and grinder parts toward and in a direction normal with this moving grinding surface until contact of the point of the diamond dressing tool 87 is made therewith (see FIG. 11).

The combined infeeding and reciprocating movements of the dressing tool 87 and the table 16 with relation to the moving grinding surface 37 by means of the respective mechanisms operated by the hand wheel 15 and the knob 61 to traverse the engaged diamond point 87 across the latter surface and cause such point to dress the same is continued.

Next, the cutting tool C–1 is placed with its longitudinal axis parallel with the plane of the moving grinding surface 37 after which the work table 16 together with the work holder 19 and the cutting tool C–1 mounted in the latter are adjusted to a position with relation to the moving grinding surface 37 so that the outer extremities of the longitudinal edges of the helical toothed elements of the cutter C–1 will engage such grinding surface when the cutter is moved transversely past the latter (see FIG. 11).

While maintaining the setting of the work table as just described, the entire work-supported head assembly 20 is swung about a vertical axis on the pivot 24 of the turntable 23 to swing the cutter C–1 into a position at right angles to its previous position so that its end teeth will face the moving grinding surface or working face 37 of the wheel 17 and its longitudinal axis will be normal thereto (see FIG. 12). The work holder head member 19 and the cutting tool C–1 thus-disposed are then moved by appropriate adjustment of the slide members 65 and 66 so that the particular end tooth to be sharpened will oppose and abut against the non-rotating vertically disposed grinding face 37 of the wheel 17. The cutting tool C–1 then is withdrawn from engagement with the wheel face 37 by appropriate reciprocation of the table 16 and the grinding wheel slide unit then is adjusted angularly a predetermined amount for effecting proper inclination of the rotational axis of the wheel spindle 38 and tilt of the grinding face 37 of the wheel 17 to grind the desired and proper clearance angle on the cutting edges of the end teeth of the tool C–1. With the grinding wheel 17 thus-disposed the table 16 is reciprocated to bring the tip portion of the cutting tool C–1 into grinding position with the wheel 17. The work-supporting head assembly 20 then is swiveled back and forth in a 90° arc about its vertical axis from either the left or right side, see FIGS. 12 and 13, depending upon the particular hand of the cutting tool C–1, and while a particular end tooth thereof is thus-engaged with the moving grinding surface 37 the latter will grind the cutting edge of such end tooth to the proper clearance angle and sharpness and at the same time contour it to a desired nose radius.

When one end of the cutting tool C–1 has been sharpened and contoured the table 16 along with the work-supporting head member 19 and the cutting tool C–1 mounted therein are moved to one side of the grinding wheel 17 where the cutting tool C–1 is indexed by hand in the head member 19 to properly orient the next end tooth preparatory to sharpening and contouring the same by grinding in the manner above-described. This sequence of cutter indexing operations is repeated between the grinding of the successive teeth and until the cutting tool has been indexed one complete revolution in the head member 19 and all of the end teeth have been operated on by the grinding wheel 17 and their cutting edges ground to the desired clearance angle and sharpness and contoured to the proper nose radius.

In the use and operation of my improved cutter grinder to corner round and sharpen the outer ends of the end teeth of radius-nose helical cutters, end mills, or other similar cutting tools, as illustrated diagrammatically in FIGS. 14 to 20 inclusive of the drawings, a radius-nose cutter to be sharpened and corner rounded, which may be of the type C–2 as shown in FIG. 7, has its shank mounted in the collet 75 of the indexible work-supporting head member 19 where it is tightly clamped therein by the clamping nut 77. When thus-mounted, the helical toothed body portion of this cutter projects outwardly and forwardly of the head member 19 in an overhung relation above the top surface of the table 16, with the longitudinal axis of the cutter C–2 disposed horizontally and at right angles to the rotational axis of the grinding wheel 17. The longitudinal axis of the cutter C–2 is brought into vertical register with the longitudinal center line of the work table 16 (see FIG. 14) by appropriate adjustment of the slide 65 by its knob 70 (see FIGS. 1–4).

It is supposed, at this time, that the axis of the grinding wheel spindle 38 has been temporarily adjusted and set to a horizontal position and that the plane of the front annular face 37 of the grinding wheel 17 is disposed substantially vertically to be properly trued off by the dressing tool 87 when the wheel dressing operations are carried out, as will be hereinafter described.

Next, the point of the diamond dressing tool 87 is set even with the line of the horizontal longitudinal axis of the cutter C–2, as thus placed in vertical register, by appropriate adjustment of the slide member 81 by means of its feed screw 83 turned by the knob 85. At this point the dial indicator gauge within the housing 94 and co-operating with the dressing tool 87 is set so as to indicate 0° reading.

Following this, simultaneous feeding movements of the dressing tool 87 and the work table 16 together with the work holder 19 carrying the cutting tool C–2 as thus mounted, all at the same rate of feed, in a direction toward the moving grinding surface 37, and in a line normal to a plane containing such surface, are effected by appropriate adjustment of the cross slide 12 by the feed mechanism operated by the hand wheel 15 (see FIG. 15). Then, the table 16 is reciprocated in a direction so as to traverse the dressing tool 87 carried thereon past the moving grinding surface 37 while continuing the aforesaid feeding movements of the dressing tool and grinder parts toward and in a direction normal with the moving grinding surface until contact of the point of the diamond dressing tool 87 is made therewith (see FIG. 16).

The combined infeeding and reciprocating movements of the dressing tool 87 and the table 16 with relation to the moving grinding surface 37 by means of the respective mechanisms operated by the hand wheel 15 and the knob 61, to traverse the engaged diamond point 87 across the latter surface and cause such point to dress the same is continued.

Next, the cutting tool C–2 is placed with its longitudinal axis parallel with the plane of the moving grinding surface 37, after which the work table 16, together with the work holder 19 and the cutting tool C–2 mounted in the latter are adjusted to a position with relation to the moving grinding surface 37 so that the outer extremities of the longitudinal helical toothed portion of the cutter C–2 will engage such grinding surface when the cutter is moved transversely past the latter (see FIG. 16).

While maintaining the setting of the work table 16, as just described, the entire work-supporting head assembly 20 is swung about a vertical axis on the pivot 24 of the turntable 23 to swing the cutter C–2 into a position at right angles to its previous position so that its end teeth will face the moving grinding surface or working face 37 of the wheel 17 and its longitudinal axis will be normal thereto (see FIG. 17).

The work table 16 then is traversed to move the dressing tool 87 into a position at one side of the moving grinding surface 37 so as to be clear of the latter. Following this, the dressing tool 87 is adjusted to set the point of the diamond to exactly lie on an imaginary horizontal line parallel with the horizontal longitudinal axis of the cutting tool C–2 and contained in the same horizontal plane passing through such axis of said cutting tool and disposed in such plane between the aforesaid tool axis and the moving grinding surface a distance equivalent to the aggregate of the radius of the helical toothed portion of the cutting tool C–2 and the desired radius of corner rounding required to be ground on the end teeth of the cutting tool (see FIG. 18), as indicated by the reading of the dial indicator or gauge 95 when the dressing tool 87 is adjusted to the aforesaid imaginary line.

Next, the work table 16 is reciprocated past the moving grinding surface 37 to traverse the diamond point 87 thereacross to cause it to dress such surface (see FIG. 19). The last-described lateral setting of the work table 16 is maintained and a swinging movement of the cutting tool C–2 and its work holder 19 and the head assembly 20 is effected about a vertical axis into a position at right angles to the previous position of the cutter tool axis so that its end teeth will face the moving grinding surface 37 and the longitudinal axis of the cutting tool will be normal thereto. The work table 16 then is reciprocated to shift the work-supporting head member 19 and the cutting tool C–2 thus-disposed in front of the grinding wheel 17 to place the particular end tooth to be sharpened opposite the rotating grinding surface 37 for engagement therewith. Thereafter the work-supporting head assembly 20 is swiveled back and forth in a 90° arc about its vertical axis either to the left or right side, see FIGS. 19 and 20, depending upon the particular hand of the cutting tool C–2, and while a particular end tooth thereof is thus-engaged with the moving grinding surface 37 the latter will grind the cutting edge of such end tooth to the proper clearance angle and sharpness and at the same time corner round the outer extremity of said tooth to a desired radius (see FIG. 20).

While one specific form of the invention has been disclosed it will be apparent that various other forms and modifications can be made without departing from the spirit of the invention, and it is therefore intended that the invention include all modifications and equivalents which fall within the scope of the appended claim.

What is claimed is:

A radius cutter grinding machine comprising a base, a cross slide adjustable transversely on said base, a horizontal table member reciprocable longitudinally on said cross slide in a direction at right angles to the transverse adjusting movements of the cross slide, a rotatable grinding wheel supported in overhanging relation to said table and having its axis of rotation disposed at right angles to the path of reciprocation of said table member, a turntable pivoted on said table member for 90° arcuate movement about a vertical axis, two superposed slide members on said turntable and each arranged to be adjusted crosswise thereof and also at right angles to each other, a work holder on the upper of said slide members and movable bodily into definite adjusted positions by the latter, and a grinding wheel dressing mechanism on said reciprocable table member and adjustably mounted thereon for transverse movements in the direction as the lower of the said two superposed slide members, said dressing mechanism comprising a slide disposed crosswise on said table member and transversely adjustable thereto, a vertical arm member on said last-named slide mounting at one end a transversely projecting dressing tool, a dial indicator affixed to this arm-carrying slide, and means on said table member cooperating with the usual operating plunger element of said dial indicator whenever the said slide member carrying the latter and said dressing tool arm member are adjusted laterally of the table member so as to locate the dressing tool in a predetermined position relative to the working face of the grinding wheel where it will be effective to engage and dress the same upon longitudinal reciprocation of the table member past the grinding wheel thereby to create and establish a preset station of grinding operation of the active grinding face of said wheel in a predetermined precise relation to a desired radius of curvature of a circular arc required to be ground thereby on selected end nose spiral teeth of a cutting tool and also definitely related to the aforesaid vertical pivot axis about which such cutting tool is susceptible to being swiveled back and forth through 90° of arc during grinding engagement of a selected cutter end tooth of the tool with such pre-established dressed moving grinding face of said wheel to effect such a rounding of the cutter end teeth, by grinding.

References Cited in the file of this patent

UNITED STATES PATENTS

| | | |
|---|---|---|
| 736,193 | Barr | Aug. 11, 1903 |
| 766,978 | Symington | Aug. 9, 1904 |
| 1,473,520 | Rosak | Nov. 6, 1923 |
| 2,421,358 | Sneva | May 27, 1947 |
| 2,460,078 | Faudree | Jan. 25, 1949 |
| 2,725,690 | French | Dec. 6, 1955 |
| 2,787,094 | French | Apr. 2, 1957 |
| 2,795,091 | Umbdenstock | June 11, 1957 |